United States Patent [19]
Cancellieri et al.

[11] Patent Number: 5,907,126
[45] Date of Patent: May 25, 1999

[54] METAL ELECTRICAL OUTLET BOX WITH PUSH-IN SCREWS FOR MOUNTING ELECTRICAL DEVICE

[75] Inventors: Salvatore A. Cancellieri, Plainville; Wilfred R. Rogers, Bristol, both of Conn.

[73] Assignee: The Wiremold Company, West Hartford, Conn.

[21] Appl. No.: 08/923,471

[22] Filed: Sep. 4, 1997

[51] Int. Cl.⁶ ........................................... H01H 9/02
[52] U.S. Cl. ..................... 174/54; 174/66; 220/242
[58] Field of Search .................... 174/53, 48, 66, 174/50, 54, 58, 51; 220/3.6, 3.8, 242, 241; 411/174, 175

[56] References Cited

U.S. PATENT DOCUMENTS

| | | |
|---|---|---|
| 2,196,711 | 4/1940 | Tinnerman ........................ 411/174 |
| 2,198,439 | 4/1940 | Kost .................................. 411/173 |
| 2,208,548 | 7/1940 | Murphy . |
| 2,228,584 | 1/1941 | Place ................................. 411/172 |
| 2,233,230 | 2/1941 | Tinnerman ........................ 411/175 |
| 2,611,460 | 9/1952 | Nash . |
| 2,625,288 | 1/1953 | Clark et al. . |
| 3,088,560 | 5/1963 | Preuss . |
| 3,335,900 | 12/1967 | Mackiewicz ...................... 220/242 |
| 3,526,703 | 9/1970 | Tucker . |
| 3,718,884 | 2/1973 | Sheldon ............................. 439/97 |
| 3,783,922 | 1/1974 | Petrus . |
| 3,876,821 | 4/1975 | Pringle . |
| 3,895,732 | 7/1975 | Robinson et al. . |
| 3,910,156 | 10/1975 | Soltysik . |
| 3,952,475 | 4/1976 | Paskert . |
| 4,012,580 | 3/1977 | Arnold . |
| 4,023,697 | 5/1977 | Marrero . |
| 4,036,389 | 7/1977 | Pate et al. . |
| 4,069,448 | 1/1978 | Gernhardt . |
| 4,071,159 | 1/1978 | Robinson et al. . |
| 4,135,633 | 1/1979 | Lockwood et al. . |
| 4,500,746 | 2/1985 | Meehan . |
| 4,643,610 | 2/1987 | Bien ................................... 403/407.1 |
| 4,669,804 | 6/1987 | Munroe . |
| 5,108,239 | 4/1992 | Clinch ................................ 411/175 |
| 5,170,013 | 12/1992 | Borsh et al. . |
| 5,170,014 | 12/1992 | Borsh . |
| 5,420,376 | 5/1995 | Rajecki et al. ..................... 174/48 |
| 5,667,059 | 9/1997 | Lee ..................................... 200/296 |

FOREIGN PATENT DOCUMENTS 0272173  6/1988  European Pat. Off. ............... 411/174

*Primary Examiner*—Kristine Kincaid
*Assistant Examiner*—Dhiru R. Patel
*Attorney, Agent, or Firm*—McCormick, Paulding & Huber

[57] ABSTRACT

An electrical outlet box is provided for assembly with a base to define an enclosed space for receiving an electrical outlet device such as a duplex plug. The plug includes threaded fasteners that are received in uniquely configured hardened steel clips. These clips are preassembled with the box for this purpose. Each clip includes an upper portion of U-shape for receiving the flat stock provided at the top portion of the box. Each clip has depending panels that cooperate to define a V-shape such that the apex of the V defines a slotted opening for receiving the threaded fastener as a result of a push-in motion. The edges of the slotted opening act on the threaded portion of the fastener to prevent its withdrawal except by unthreading.

7 Claims, 4 Drawing Sheets

METAL ELECTRICAL OUTLET BOX WITH PUSH-IN SCREWS FOR MOUNTING ELECTRICAL DEVICE

CROSS REFERENCE TO RELATED APPLICATIONS

This application is related to a co-pending application entitled "Electrical Outlet Box With Base And Snap-On Cover For Use With Electrical Metal Tube (EMT)", Ser. No. 08/864,345 filed May 28, 1997. This case is also related to a prior pending application Ser. No. 08/436,613 filed May 8, 1995 and entitled "Metal Outlet Box With Snap Together Base And Cover". Both co-pending applications are incorporated by reference herein.

BACKGROUND OF THE INVENTION

The present invention relates to the fabrication of metal outlet boxes of the type used with electrical surface raceway, and deals more particularly with such a box comprising a metal base, of the type secured to a wall structure or like, and a box which is mounted to the base either by screws or preferably in a snap-mount arrangement as described in the above-identified co-pending application Ser. No. 08/436, 613. An electrical device such as a duplex plug or electrical switch of conventional configuration is adapted to be mounted in a top opening of the box. The device includes threaded screws that are generally threadably received in threaded openings of the box. However, the present invention uses metal fasteners or clips which are secured to the cover for receiving the threaded fasteners in a push-in assembly step that avoids the need for threading the fasteners at assembly.

Finally, a cover plate is adapted to be snap-mounted to the box and to surround the visible portion of the electrical outlet plug or switch.

DESCRIPTION OF THE PRIOR ART

In a typical metal outlet box of the type now used with surface steel raceway or electrical metal tubing (EMT), the flat base is generally secured to a wall structure or the like by conventional fasteners or screws. A metal box is then secured to the base either by conventional fasteners, or more preferably by means of unique snap-in features such as suggested in the above-identified prior co-pending application Ser. No. 08/436,613. Metal raceway is provided to the electrical outlet box and connected thereto by tangs provided on the base. Knockout openings on the box allow assembly of the raceway with the box in accordance with conventional technology. Prior art constructions have heretofore required that threaded openings be provided in the top portion of the box to receive the fasteners associated with the electrical outlet device. Although advantages have been achieved as a result of the structure shown in Ser. No. 08/436,613; which permits a snap-on box to be assembled with such a base, it has heretofore been required that the fasteners associated with the electrical device be threadably screwed into the cover, a time consuming task that is eliminated as a result of practicing the present invention.

SUMMARY OF THE INVENTION

The object of the present invention is to provide an electrical outlet box configuration that not only allows snapping the box onto a base without the requirement for threaded fasteners, but which also includes means for quick assembly of the outlet device itself in the box as a result of unique hardened steel fasteners or clips provided for this purpose adjacent the top opening of the box.

Another object of the present invention is to provide a snap-on face plate associated with the outlet device to permit assembly of the entire structure without the need for threaded fasteners, except those required to secure the base to the wall.

Another important object and purpose of the present invention is to provide a unique hardened steel fastener or clip which is well suited for use with the softer metal normally provided in metal electrical outlet boxes generally. These uniquely configured hardened steel clips are readily assembled on the box for receiving the fasteners in a mode of operation at assembly that nevertheless requires unthreading of the fasteners in order to remove the electrical device from the outlet box.

The foregoing objects are accomplished in accordance with the present invention by providing an electrical outlet box on a base which accommodates conventional wire raceway, and wire connections that are adapted to be terminated in the box itself. The box is downwardly open so as to be received on a base and held thereto by mutually co-acting abutting surfaces of the type shown in the prior application Ser. No. 08/436,613. Alternatively, the box and base are held together by conventional fasteners. The top wall of the outlet box defines a top opening for receiving a conventional electrical outlet device such as a duplex plug for example.

In further accordance with the present invention, hardened steel clips are provided on the end portions of the top of the box so as to permit the fasteners of the electrical device to be pushed into these fasteners. These fasteners are designed to require unthreading of the fasteners upon removal of the device from the box.

An electrical outlet plate or cover, which may be fabricated of plastic, is mounted to the box to provide a finished appearance for the resulting assembly. Assembly of this cover with the box may be with fasteners, but it is preferably with a snap together construction that avoids use of such fastener.

The hardened steel clips for so receiving the threaded fasteners require clearance openings in the top end portions of the outlet box, and each fastener receiving device includes a U-shaped clip portion for slidably receiving this panel portion of the box. The clip portion defines a clearance opening that is aligned with the clearance opening in the panel portion of the box so that the device will accept the fastener. Each said device further includes panels integrally connected to this clip portion and cooperating with one another to define a V-shape so oriented that the apex of the V-shape defines a slotted opening spaced from the clip portion clearance opening. As a result, a threaded fastener can be pushed into the device and create engagement between the fastener threads and the lower edges of these panel defined slotted opening so as to prevent removal of the fastener other than by unthreading. The V-shaped panels are resiliently deformable during insertion of the fastener in the push-in assembly step such that threading of the fastener to secure the electrical device or subassembly in the outlet box is not required. However, upon removal, unthreading of the fastener is required, providing a secure lock for the device in the mild steel outlet box itself.

BRIEF DESCRIPTION OF THE DRAWINGS

A more complete understanding of the invention and many of the attendant advantages thereto will be readily appreciated as the same becomes better understood by reference to the following detailed description when considered in conjunction with accompanying drawings wherein.

DETAILED DESCRIPTION

FIGS. 1–4 illustrate a preferred embodiment of the present invention. As mentioned previously, the electrical outlet box may be snapped onto a metal electrical outlet base as taught in the co-pending application Ser. No. 08/436,613 filed May 8, 1995 and entitled "Metal Outlet Box with Snap-Together Base and Cover". Alternatively, the metal box may be conventionally secured to the base by fasteners or the like.

Figure 1:
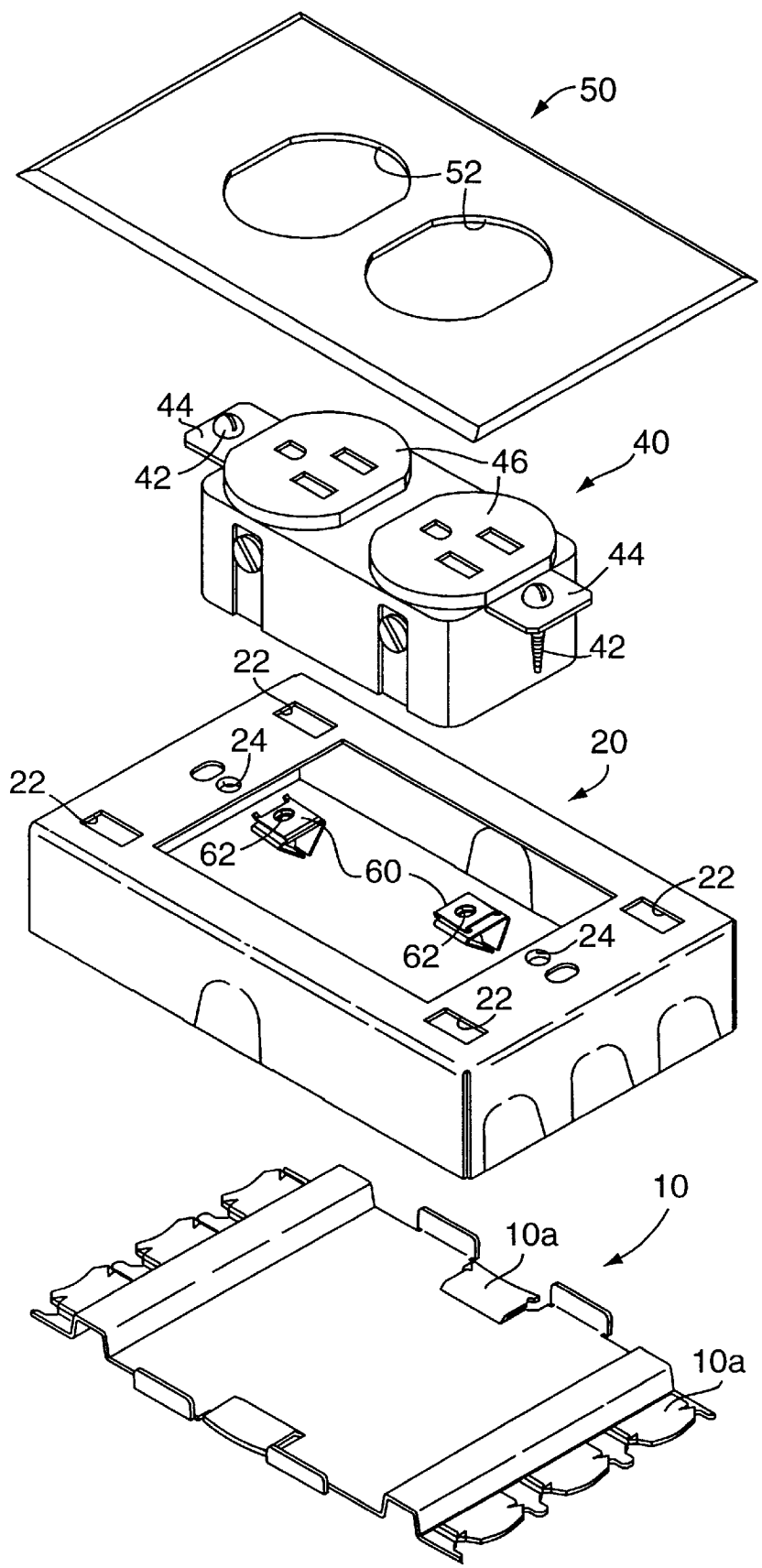
FIG. 1 is an overall exploded view of a preferred form of the invention, and illustrates the base that is adapted for securing to wall structure or the like, detailing the open rectangular box that is preferably snap-mounted on the base, hardened steel fasteners, which are shown separated from, but readily assembled with the box, a conventional duplex electrical outlet plug device with associated screw fasteners, and a face plate or cover.

Electrical outlet boxes of this general variety are generally fabricated from relatively soft or mild steel stock which is bent from an initially flat configuration into the desired shape, as shown in FIG. 1. The base is indicated generally at 10 and the electrical outlet box at 20. Both components are preferably fabricated from such mild steel stock, but could instead be fabricated other soft metal material such as aluminum for example.

A conventional outlet plug of the duplex type is shown generally at 40, and includes pre-positioned conventional fasteners 42, 42 provided for this purpose in ears 44, 44. Ordinarily, such fasteners must be threaded into threaded openings provided for this purpose in a metal electrical outlet box. However, in accordance with the present invention such a preliminary assembly step is not required, and an important feature of the present invention provides for the push-in assembly of these fasteners so that the electrical outlet device 40 can be quickly mounted in the outlet box 20 in a manner to be described. Finally, the assembly of FIG. 1 includes a coverplate 50 with openings provided at 52 so as to allow access to the female outlet plugs 46, 46. The plate 50 preferably includes depending posts (not shown) which are received in locating holes 22, 22 provided for this purpose in the metal box 20. Additional openings 24, 24 are provided in the metal outlet box 20 for loosely receiving the fasteners 42, 42.

Figure 2:
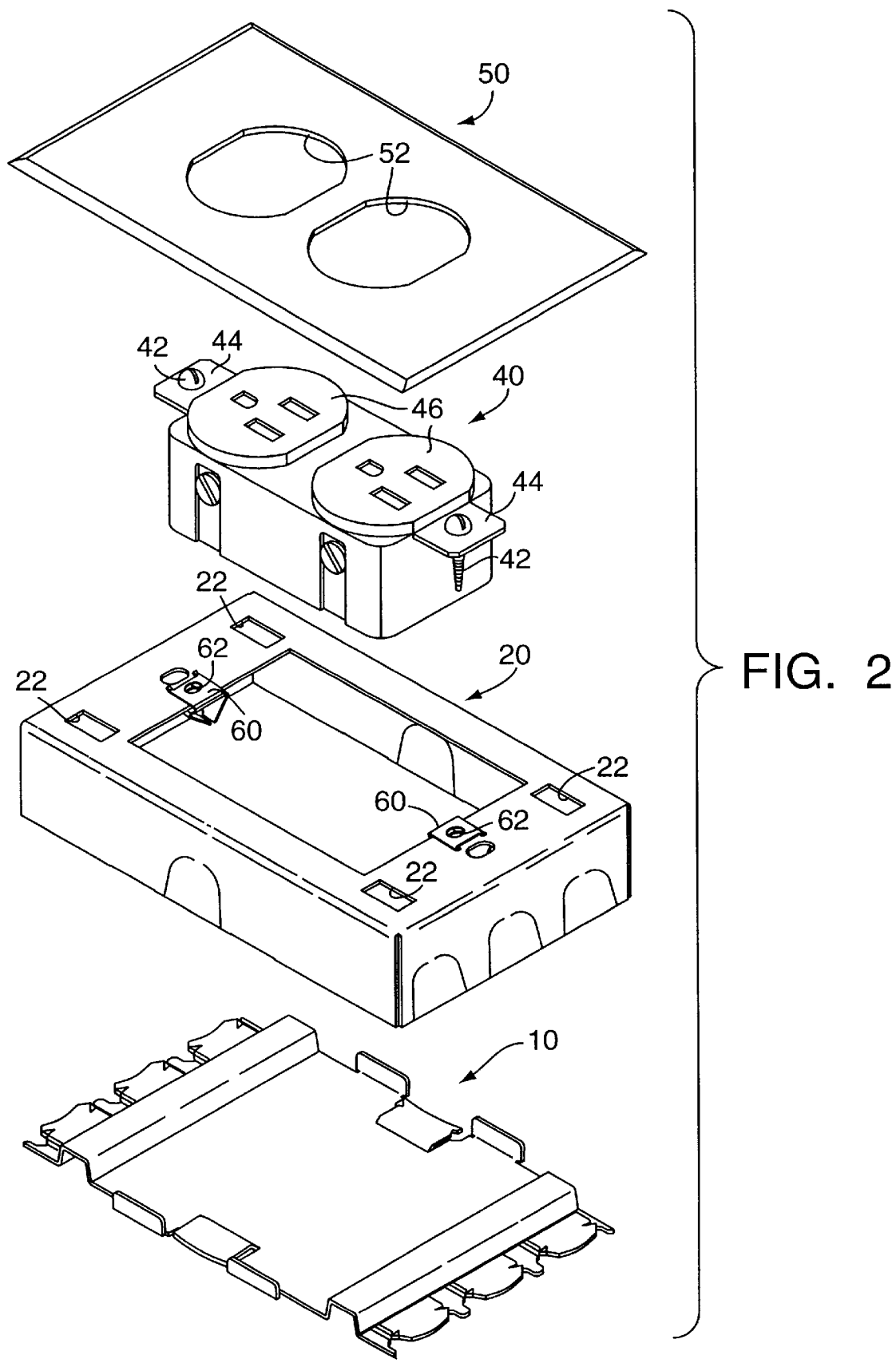
FIG. 2 is a view generally similar to FIG. 1 but illustrating the hardened steel clips mounted to the electrical outlet box.

Prior to assembly of the outlet device 40 with the box 20 hardened steel clip devices 60, 60 are provided in the positions shown for them in FIG. 2. Each of these devices 60, 60 itself defines a clearance opening that is aligned with a clearance opening in the cover as best indicated at 62 in FIG. 2. The fasteners 42, 42 are loosely received in these aligned clearance openings 62 and 24.

Figure 3:
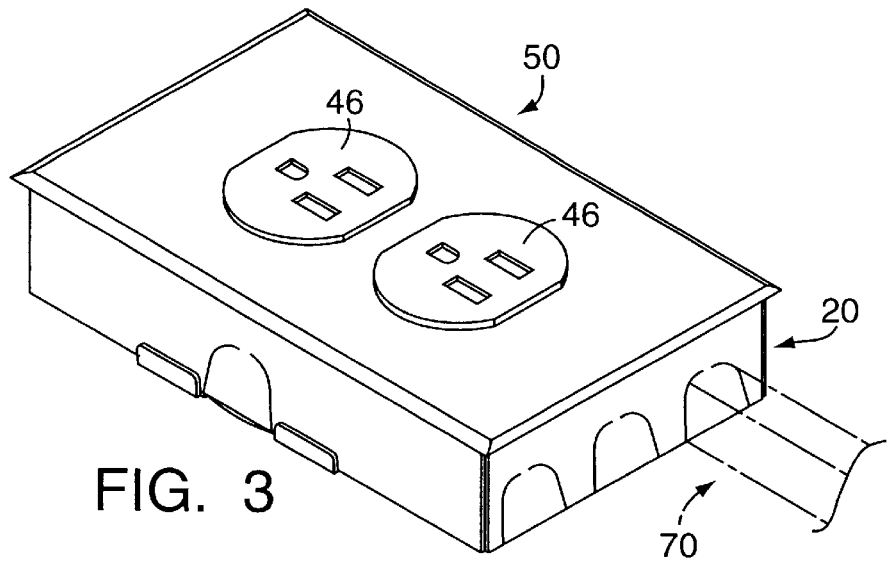
FIG. 3 is an overall view of the assembled electrical outlet box.

The hardened steel clips 60, 60 will have been preassembled in the position shown for them in FIG. 2 prior to the delivery thereof to the workman or electrician who will be installing an electrical outlet box of the type described above. FIG. 3 shows the overall assembly of the outlet box with the coverplate 50 snap-mounted on the box 20 and with the electrical outlet device provided inside the box so that the duplex receptacles 46, 46 are situated in the openings provided for this purpose in the coverplate 50. A typical surface metal raceway of the one-piece type is indicated generally at 70 having been provided in one of the knockout openings of the cover and having its end portion slidably received on one of the tangs 10a provided for this purpose on the base 10.

Figure 4:
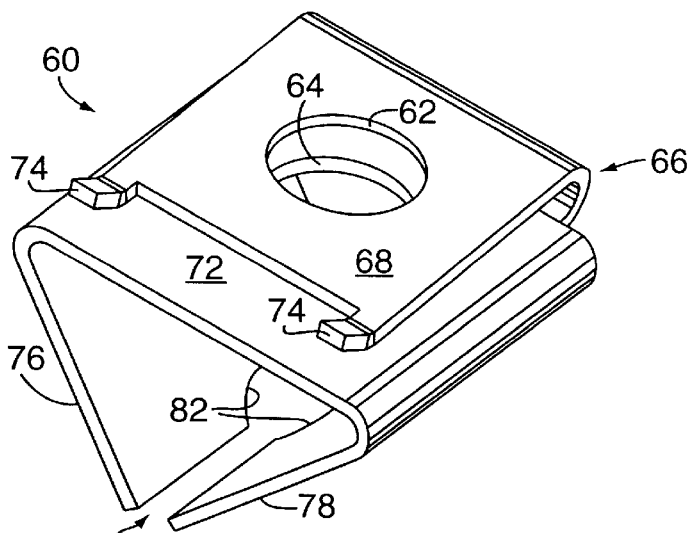
FIG. 4 is a perspective view of one of the hardened steel clips shown in FIGS. 1 and 2.
Figure 5:
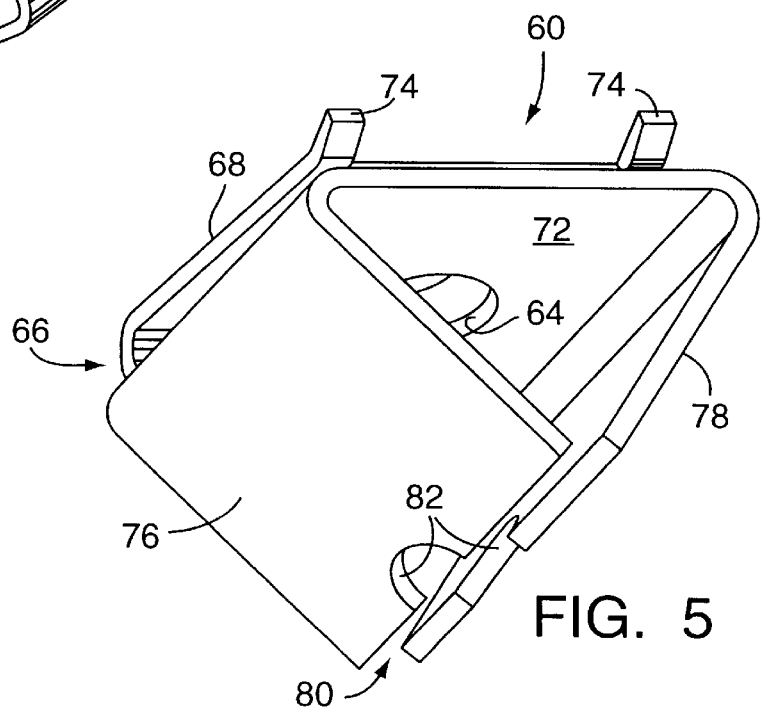
FIG. 5 is a perspective view of the hardened steel clip taken from a slightly different vantage point.

Turning now to a more detailed description of the spring steel clips or devices used on the relatively soft metal box for receiving the fasteners, FIGS. 4 and 5 show a preferred form of such a device 60. One preformed clearance opening is indicated generally at 62, and a second clearance opening aligned with the first is shown generally at 64.

Each clip portion or device 60 includes a generally U-shaped clip portion 66 that is more particularly defined by upper and lower panel portions 68 and 72 that in turn define the clearance openings 62 and 64 respectively. The upper panel portion 68 includes upwardly turned tangs for facilitating assembly of the clip portion with the underlying panel portion of the metal outlet box 20.

Figure 7:
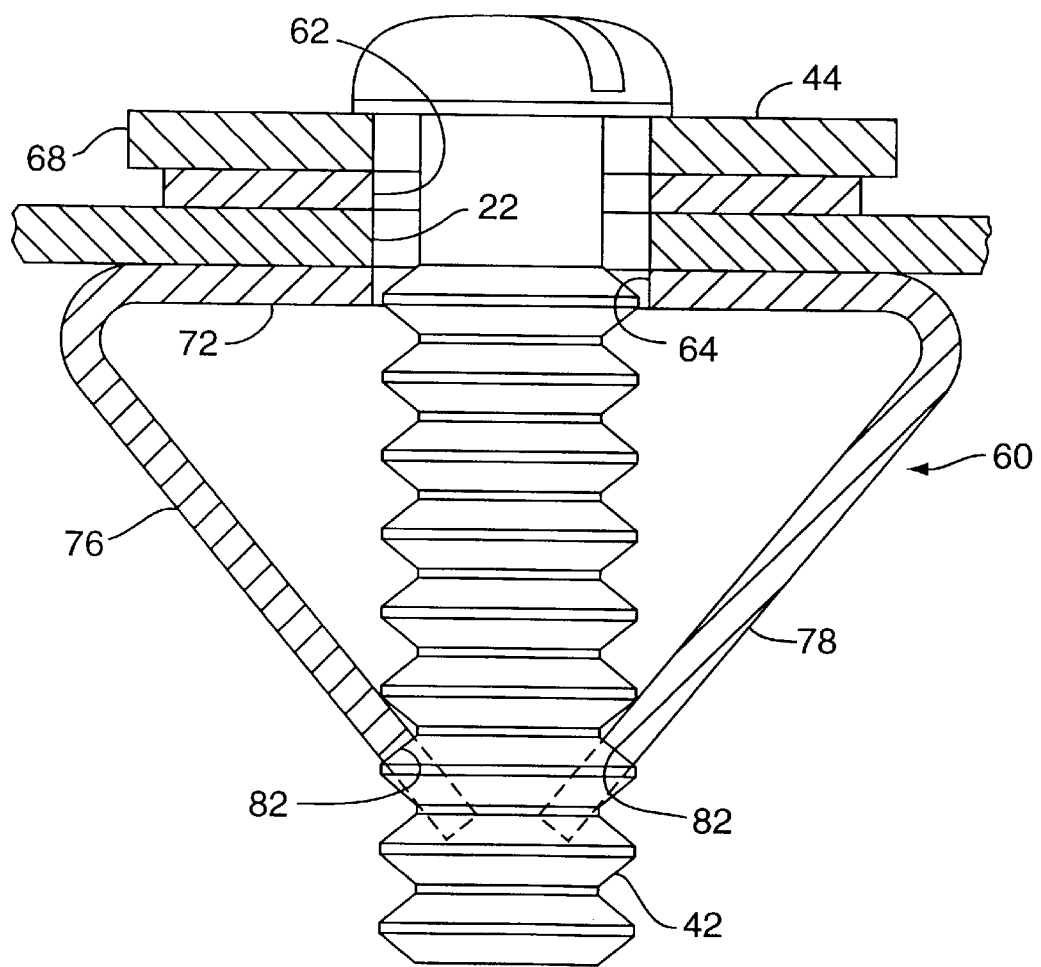
FIG. 7 shows the hardened steel clip in vertical section to better illustrate the assembly thereof with the outlet box, and also illustrates the tabs on the electrical outlet device together with associated screw fasteners for assembly of these various components.

Still with reference to the hardened steel insert 60 inwardly formed depending panels 76 and 78 are arranged in a V-shape such that the apex of the V, indicated generally at 80 defines a slot which includes a slightly enlarged inner portion 82 for engaging the fastener threads. In the unstressed configuration of the device, this enlarged portion 82 is adapted to engage the threads of the fastener as suggested in FIG. 7 such that the screw fastener once inserted between these panels cannot be withdrawn unless if it is rotatably unthreaded, as by means of a tool provided in the slotted head portion of the fastener.

The spring steel material from which the clip/device is fabricated not only provides for resilient deformation of the panels 76 and 78 during insertion of the fastener 42, but also provide the necessary force on the thread of the fastener 42 so as to securely hold that fastener in place once it has been positioned by the electrician during assembly of the outlet box all as described previously. See FIG. 7 for a graphic illustration of the interaction between the fastener thread and the portions 82,82 of the insert 60.

Figure 6:
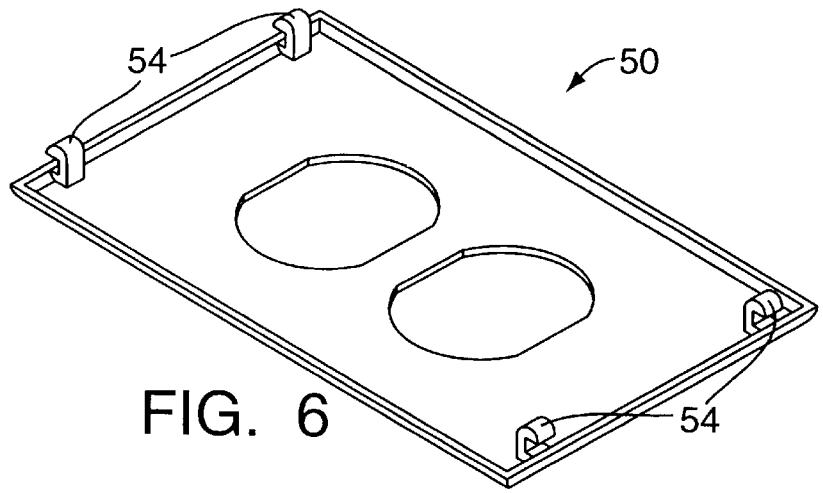
FIG. 6 is a bottom perspective view of the cover plate or face plate shown in FIGS. 1–3.

FIG. 6 is a bottom view of the polymeric coverplate illustrated at 50 in FIGS. 1 and 2, and shows the depending locating pins 54, 54 integrally molded in the backside of the plate 50 and so arranged and spaced for snap fit in the locating holes 22, 22 of the outlet box 20.

We claim:

1. An electrical outlet box having side and end walls defining a downwardly open back side for receiving a base, and having a top wall portion which defines a top opening for receiving an electrical device, a pair of hardened steel fastener receiving devices, each of said hardened steel fastener receiving devices including a U-shaped clip portion for receiving a portion of said top wall portion, each said clip portion having a clearance opening for loosely receiving a threaded fastener of the electrical device, and each of said hardened steel fastener devices further including panels integrally formed with said clip portion said panels cooperating with one another to define a V-shape so oriented that the apex of the V-shape defines a slot opening spaced from said clearance opening of each said clip portion, said slot opening of each of said hardened steel fastener receiving devices having a width that receives the threaded fastener without requiring rotation thereof, the resiliency of the V-shaped panels of the hardened steel fastener receiving devices exerting a clamping force on the threaded fastener so as to require unthreading of the fastener for its removal.

2. The electrical outlet box according to claim 1 wherein said outlet box is formed from a mild steel flat stock, said outlet box defining abutments that cooperate with said base to provide an interference fit therebetween whereby said outlet box and base are snapped together.

3. The electrical outlet box according to claim 1 wherein said top wall portion of said outlet box further includes locating openings, and a coverplate said coverplate including depending posts received in said locating openings, said outlet box being made from metal, said coverplate being made from a polymeric material.

4. The electrical outlet box according to claim 1 wherein said top wall portion of said outlet box includes clearance openings aligned with each of the clearance openings of said U-shaped clip portions of each of said hardened steel fastener receiving devices.

5. A device for slidably receiving a threaded fastener as a result of pushing said fastener through a clearance opening in a panel portion of an electrical outlet box, said device comprising a clip portion for receiving the panel portion, said clip portion including a clearance opening which is adapted to be aligned with the clearance opening in the panel portion to receive the threaded fastener, said device further including panels integrally connected to said clip portion and cooperating with one another to define a V-shape so oriented that the apex of the V-shape is defined by slotted opening edges spaced from said clip portion clearance opening whereby the threaded fastener can be pushed into said deice to create engagement between the threaded fastener and said opening edges, said slotted opening edges define a slotted opening at the apex of the V-shape thereby preventing removal of the fastener other than by unthreading, said panels being resiliently deformable upon insertion of the fastener in a push-in assembly step, and said slotted opening edges acting on the threads of the fastener to secure the fastener and any electrical subassembly provided thereon in the electrical outlet box.

6. The device of claim 5, wherein said slotted opening and said clip portion clearance opening define a plane of symmetry for said device.

7. The device of claim 6, wherein said clip portion is U-shaped for slidably receiving a portion of the outlet box, and wherein said panels are integrally connected to said U-shaped clip portion.

\* \* \* \* \*

UNITED STATES PATENT AND TRADEMARK OFFICE
CERTIFICATE OF CORRECTION

PATENT NO.   : 5,907,126
DATED        : May 25, 1999
INVENTOR(S)  : Cancellieri et al.

It is certified that error appears in the above-identified patent and that said Letters Patent is hereby corrected as shown below:

Claim 5:

Column 6, line 12, after "said", please delete "deice" and insert --device--.

Signed and Sealed this

Twenty-seventh Day of June, 2000

*Attest:*

Q. TODD DICKINSON

*Attesting Officer*　　　*Director of Patents and Trademarks*